UNITED STATES PATENT OFFICE.

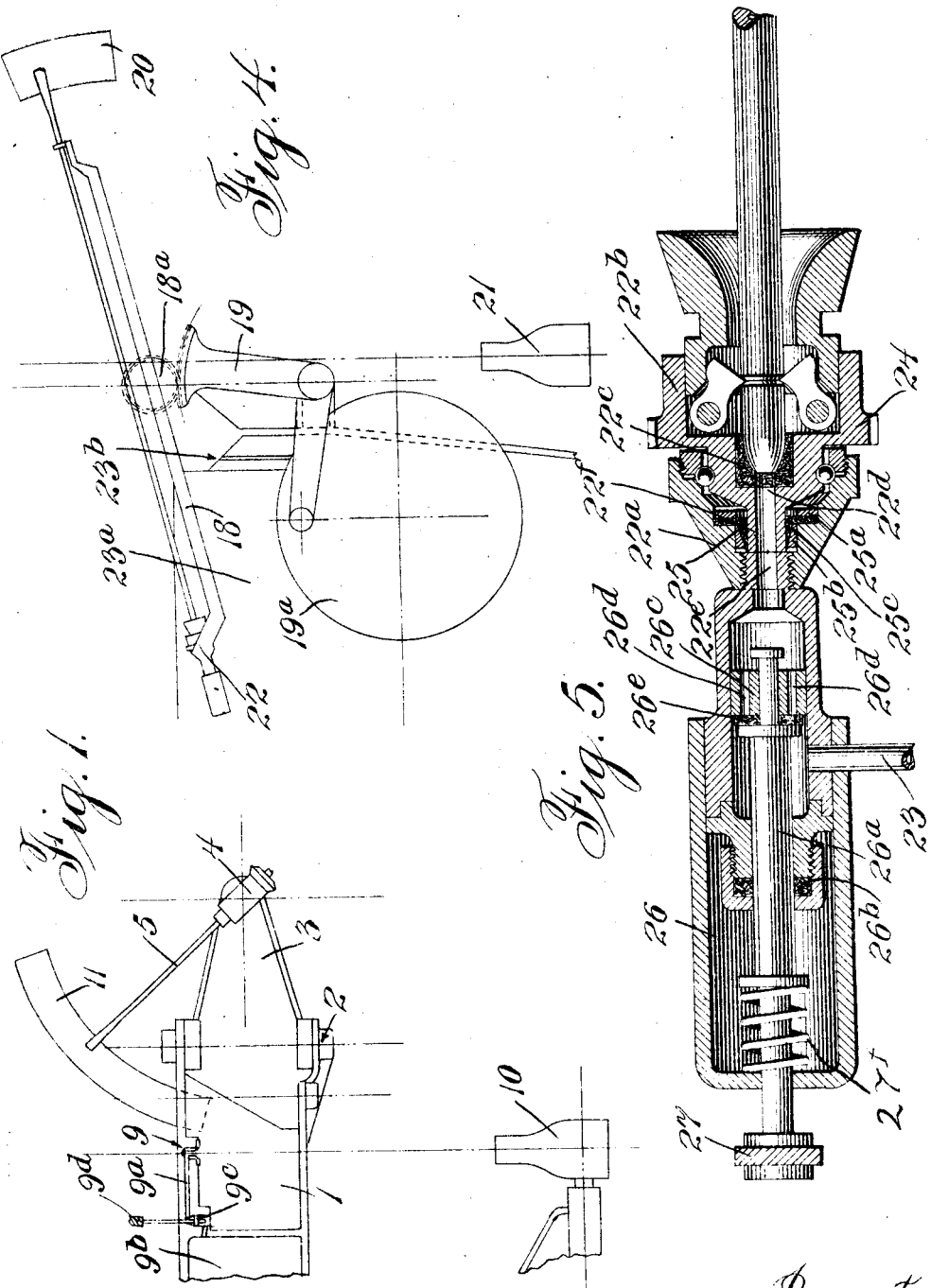

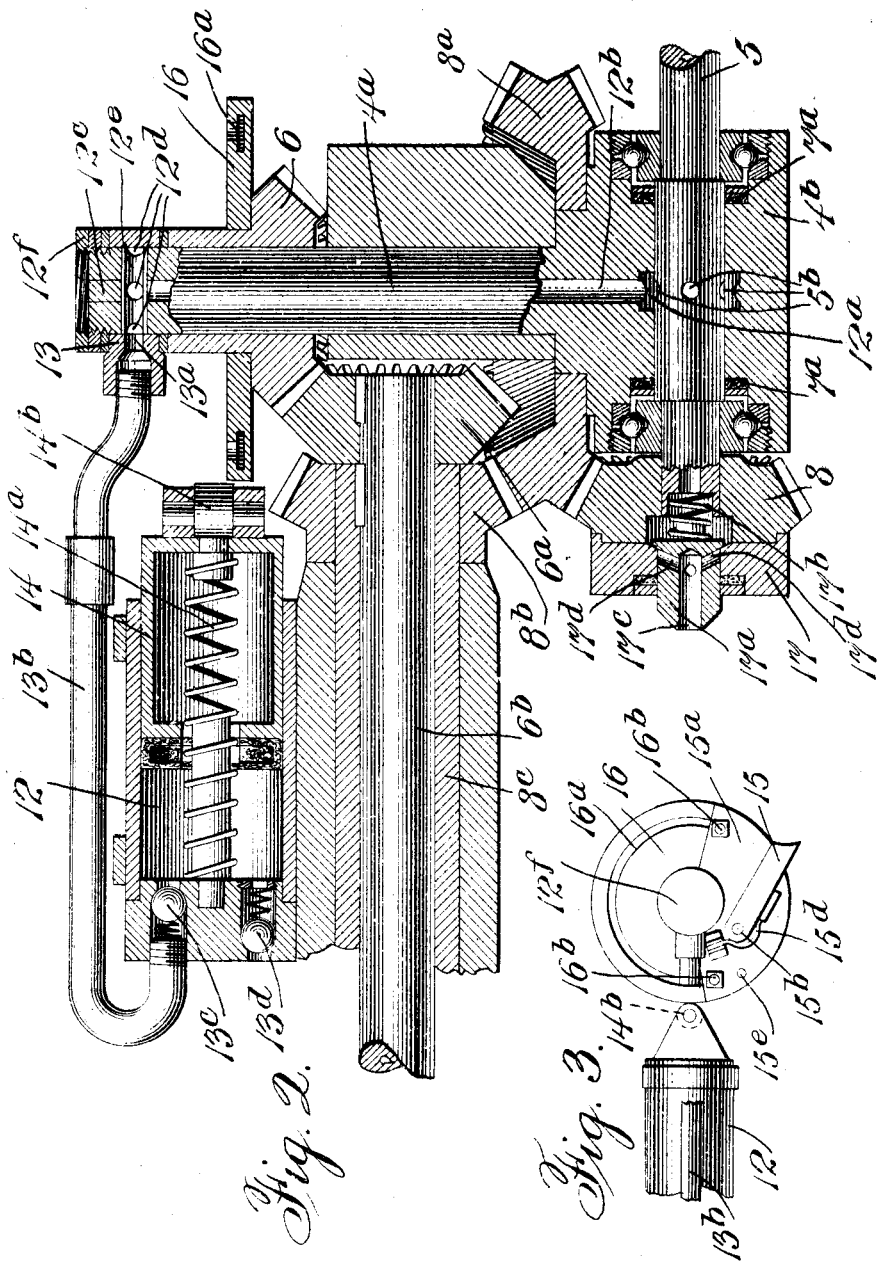

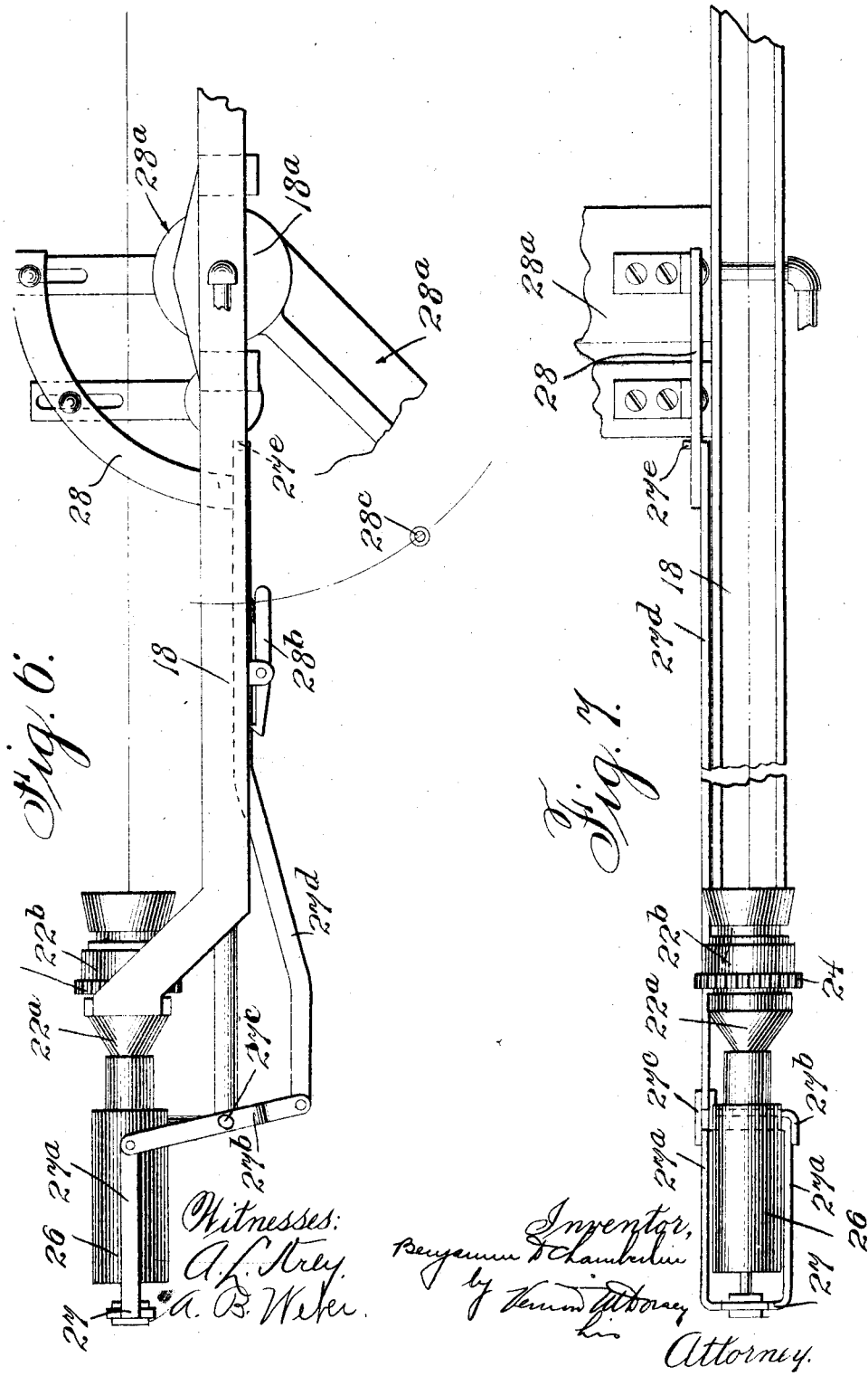

BENJAMIN DAY CHAMBERLIN, OF CORNING, NEW YORK, ASSIGNOR TO EMPIRE MACHINE COMPANY, OF PORTLAND, MAINE, A CORPORATION OF MAINE.

MACHINE FOR THE MANUFACTURE OF BLOWN-GLASS ARTICLES.

1,124,699.  Specification of Letters Patent.  Patented Jan. 12, 1915.

Application filed February 7, 1911. Serial No. 607,179.

*To all whom it may concern:*

Be it known that I, BENJAMIN D. CHAMBERLIN, a citizen of the United States of America, and a resident of Corning, New York, have invented certain new and useful Improvements in Machines for the Manufacture of Blown-Glass Articles, of which the following is a specification.

This invention has for its object to provide a novel mechanism for producing blown glass articles of those kinds which are made from masses of glass which are roughly preshaped upon the end of a blow iron into a blank in any suitable way, and are subsequently brought to a finished shape by blowing in a mold, it being especially applicable to the better grades of such articles, such as electrical lamp bulbs and other thin walled products. I have found that in the production of these it is advantageous that the preformed blank have a limited and definite quantity of air introduced into it and have the pressure so created positively held for a short period. The amount of air introduced at this time is relatively small and a small leakage has therefore the effect of greatly reducing the predetermined pressure in the blank, with a variation of the amount the latter is blown out, which acts to destroy uniformity in the subsequent molding. It is important therefore that the amount of air so introduced be capable of an accurate determination and be sufficient to result in the formation of a central cavity of practically uniform size in the interior of the blank when the air so introduced has finished its expansion and that it be held within the blank until such time without leakage.

My invention therefore consists in mechanism for accomplishing this and comprises a piston pump for delivering on each stroke a definite volume of air under definite pressure to the blank, and of means for holding the pressure so created until the air has fully expanded therein. The amount of air necessary for molding has no definite relation to the amount of air necessary in blowing out and my invention therefore further contemplates a separate and additional air supply for that purpose with proper means for controlling the admission of air.

My invention further consists in the construction, combination and arrangement of the several parts of which it is composed and which will be hereinafter more fully described and claimed.

Referring to the accompanying drawings in which corresponding parts are designated by corresponding marks of reference, Figure 1 is a diagrammatic view of a machine embodying one form of my invention. Fig. 2 is a sectional detail view of the blow-out mechanism thereof. Fig. 3 is a detail elevation of the pump actuator of Fig. 2. Fig. 4 is a view similar to Fig. 1 but showing another form of machine, which embodies the preferred form of my invention. Fig. 5 is a longitudinal section of the blow out mechanism thereof. Fig. 6 is an enlarged elevation of the blow-out mechanism and its mounting. Fig. 7 is a top plan view thereof.

From what has been said it will be understood that this invention is not restricted to the manner in which the blank may be put on the blow-pipe or the manner in which it may be preformed, and while I have in the accompanying drawings shown the preforming mechanism in the form of a plain faced marverer, it will be understood that this may be replaced by any other mechanism capable of properly preshaping the blank without departing from the spirit of my invention.

As shown in Figs. 1, 2 and 3 the mechanism for carrying out this invention forms a part of that shown in my other application filed March 23, 1910, Serial No. 551,198 and comprises a supporting arm 1, on which is pivoted by a vertical pivot 2, a blow-pipe carrying frame 3, in the free end of which is horizontally journaled the stem 4ª of the blow-pipe support 4, the stem having upon its forward end a cross head 4ᵇ which holds the radially projecting blow-pipe 5, the latter projecting through a cross head at right angles to the stem, so that the blow-pipe by the rotation of the stem will be moved in a vertical plane. This rotation of the stem is provided for by keying a beveled gear 6 thereon in the rear of a bearing formed in the blow-pipe frame and driving the same through a pinion 6ª fast on the outer end of a horizontal shaft 6ᵇ contained in a longitudinal bearing in the web of the carrying frame. This shaft is driven by mechanism not necessary to be herein described, the function of which is to lift the gather on the end of the blow-pipe, and to then lower such gather end until the blow-pipe stands vertically. Mechanism is also provided for rotating the blow-pipe around its longitudinal axis and for this purpose the blow-pipe is journaled in the cross head 4$^b$ and is provided with packing rings 7$^a$ around the end of such journal. The upper end of the blow-pipe projects above the cross head and has keyed thereon a beveled gearing 8, which, through the interposition of a double beveled gearing 8$^a$ sleeved on the stem 4$^a$ between the front face of the frame and cross head, is driven by a beveled pinion 8$^b$ keyed to the outer end of a sleeve 8$^c$ surrounding the shaft 6$^b$ and contained in the longitudinal bearing of the blow-pipe frame. This shaft is constantly driven by mechanism which is not necessary to be here described.

The arm 1 has suitably formed therein an air port 9 communicating by the air passage 9$^a$ with the air tank 9$^b$ for the blowing air, a suitable valve 9$^c$ being interposed in the air connection for the purpose of controlling the flow of blowing air, this air valve being actuated by means of a cam 9$^d$ actuated in the manner described in my prior application. Situated vertically below the air port 9 at such a distance that a blow-pipe having its upper end immediately beneath the air port and in contact therewith will have its lower end in proper relation thereto for molding, is the mold 10, the nature of which is fully shown in my said prior application. The vertical line joining the mold and the air port is also so situated in respect to the vertical axis upon which the blow-pipe frame 3 turns, that by swinging the latter upon such axis the blow-pipe carried in the frame when vertical will register with the said air port and be above the mold.

Mounted upon the arm 1 is an arc shaped marverer 11 with its center of curvature at the axis of the stem of the blow-pipe support when the blow-pipe frame carrying such support is extended outwardly on its supporting arm and being so positioned that the blow-pipe when swung at such time on the horizontal pivot formed by such stem will have the gather thereon in contact with the marverer.

The above mechanism is all fully shown and described in my said prior application together with actuating devices whereby the proper coaction of the parts is secured, the action being such, that the gather on the blow-pipe is swung up and along the marvering face, is then lowered by a reverse movement until the blow-pipe is vertical and that the blow-pipe frame is moved on its horizontal pivot to insert the blow-pipe beneath the air port and above the mold, after which the air valve 9$^c$ is operated to admit blowing air into the blow-pipe for the air reservoir 9$^b$.

For the purpose of accomplishing the blowing out of the gather prior to its insertion in the mold and prior to the elongation which it undergoes when the blow-pipe is vertical a blow out mechanism is employed which forms the subject matter of this application. As shown such means consists of a pump cylinder 12 secured to the rear face of the blow-pipe carrying frame 3. The longitudinal bore in the blow-pipe cross head 4$^b$ is provided with a central enlargement 12$^a$ and the blow-pipe has radial apertures 5$^b$ communicating between its central bore and such enlargement. The stem 4$^a$ has a central passage 12$^b$ extending from such enlarged recess to its opposite end where it is closed by a plug 12$^c$ and where it has radial ports 12$^d$ whose outer ends terminate in an annular groove 12$^e$ in the sleeve near its end. Surrounding the end of the stem is a collar 13 which is interposed between the hub of the beveled gear 6 and the cap 12$^f$ on the extreme rear end of the stem. The collar 13 has in its one side an aperture 13$^a$ which registers with the annular groove 12$^e$ in the stem and is connected with the cylinder 12 by the pipe 13$^b$ in which is interposed the check valve 13$^c$, whereby air can flow from said cylinder through the central passage 12$^b$ of the stem into the interior of the blow-pipe.

Within the cylinder 12 is contained the piston 14 normally thrown out by the spring 14$^a$ to draw air in through the induction valve 13$^d$. The piston 14 has on its outer end a roller 14$^b$ adapted to be struck by a cam 15 carried on the gear 6 and thus on the stem of the blow-pipe support, and being thus adapted to drive the piston within the cylinder to force a puff of air into the blow-pipe at the proper time. In order to provide for variation in this time and further to permit a reciprocating rotary motion of the blow-pipe stem 4$^a$ with the puff occurring only when the stem is moving in one direction I employ the construction shown in Fig. 3 in which the cam 15 is in the shape of an arm pivoted at 15$^b$ to a quadrant plate 15$^a$, the arm being held at about the position shown by a spring 15$^d$. With this construction when the stem 4$^a$ is rotated in the direction of the arrow in Fig. 3, the arm 15 will pass the roller 14$^b$ without actuation of the pump and plunger, due to the turning of the arm upon its pivot and will after passing the same immediately swing back to the position shown. Upon the reversed rotation of the stem however the notched free end of the arm will become seated on the roller and will result in an inward stroke of the plunger until the arm finally slides by the movement of the arm in this direction being limited by the stop pin 15ᵉ. In order to provide for a change in the time at which this inward stroke of the plunger takes place and thus a change of the time of the puff of air admitted to the blow-pipe, the quadrant plate is angularly adjustable on and in respect to the stem 4ᵃ by mounting the quadrant plate on a disk 16, it being secured by the T slots 16ᵃ formed in the disk and by proper clamping bolts 16ᵇ entering the same. It will be noted that as at the time of the puff the blow-pipe is not underneath the air port but that the upper end of the bore of the blow-pipe is sealed by reason of the fact that a plunger 17ᵃ to be hereinafter described is at such times projected by its spring 17ᵇ and thus the escape of the air at such period is prevented.

The gear 8 mounted upon the end of the blow-pipe carries a cap 17 having a central bore in which is contained a plunger 17ᵃ, pressed outwardly toward the top of the cap by a spring 17ᵇ, the plunger having a rounded end and an axial central hole 17ᶜ extending from such end inwardly and connecting with the periphery of the plunger near the rear end thereof by radial ports 17ᵈ, the construction being such that, when the plunger is projected by the spring, the ports 17ᵈ will be closed by the cap but, that when the plunger is depressed such ports will open and the central hole 17ᶜ of the plunger will be in communication with the central bore of the blow-pipe through the central chamber of the gear 8. In the movement of the blow-pipe in the operation of the machine, its upper end, will at certain times be brought beneath the air ports 9 and at such times the plunger will be depressed to admit the flow of molding air into the blow-pipe when the air valve 9ᶜ is opened.

In Figs. 4, 5, 6 and 7, I have shown the preferred form of my present invention as applied to machine shown in my other prior application filed January 13, 1911, Serial No. 602,532. In these figures a removable blow-pipe is carried in the blow-pipe frame 18 mounted in a horizontal trunnion 18ᵃ, the blow-pipe being adapted to be swung through a limited vertical arc by means of the rack sector 19 actuated by cam disk 19ᵃ so that the gather thereon may be moved past a marverer 20 and presented to a mold 21, the latter occurring when the blow-pipe is vertical. The blow-pipe frame carries on one end a chuck 22, which consists of a block 22ᵃ having mounted on its forward ends by ball bearings a shell 22ᵇ by which is carried suitable means for engaging the blow-pipe, as is fully shown in my prior application, Serial No. 602,532. The chuck shell has an interior packing 22ᶜ surrounding an axial aperture 22ᵈ, the end of the blow-pipe taking against the packing. The chuck block has an air passage 22ᵉ registering with the aperture and connected through the cylinder 26 to be hereinafter described to an air pipe 23 which enters the hollow trunnion of the blow-pipe frame and from there connects to the reservoir 23ᵃ for the blowing air, a suitable valve 23ᵇ actuated from the main cam disk 19ᵃ being interposed in the air connection as is fully set forth in my said prior application Serial No. 602,532. The chuck shell has a gear 24 upon its periphery through which by suitable means fully shown in my last named application 602,532, the blow-pipe is rotated. An air tight joint is secured between the stem 22ᶠ of the shell and a block by a cupped leather washer 25 seated against a shoulder on the block by a ring 25ᵃ, an internally coned ring 25ᵇ surrounding the flange 25ᶜ of the washer. The result of this construction is that the air pressure existing during the blowing upon the rear end of the ring forces the latter forwardly to compress the flange upon the stem of the shell.

For the purpose of introducing the proper quantity of blow-out air in the manner before specified a cylinder 26 is mounted on the rear of the chuck block 22ᵃ and contains a piston 26ᵃ passing through a stuffing box 26ᵇ in the cylinder by which it is guided. The piston has on its forward end a sliding head 26ᶜ provided with ports 26ᵈ which, when the head is at its rear limit of movement on the piston, are closed by a washer 26ᵉ on the piston in the rear of the head.

The rear end of the piston has a cross head 27 thereon, from the opposite ends of which links 27ᵃ project forwardly to the upper end of a yoke lever 27ᵇ, pivoted at 27ᶜ to a support from the rear end of a blow-pipe frame. To the lower end of the lever 27ᵇ is secured the forward end of the link 27ᵈ guided for longitudinal movement on the inner side of the blow-pipe frame, its forward end terminating in a finger 27ᵉ which is adapted when the blow-pipe frame is moving to vertical position to run upon a track 28 mounted eccentrically on the main frame 28ᵃ of the machine in respect to the bearing of the blow-pipe frame trunnion, whereby at the time stated the piston will be retracted by the track against the tension of a spring 27ᶠ. When the piston is so retracted the link 27ᵈ will be caught by a trigger 28ᵇ pivoted at the bottom of the blow-pipe frame, which trigger is adapted to be released from the link by a pin 28ᶜ on the main frame as the gather approaches its upper limit of movement.

In the practical operation of the machine as I have constructed it, the air control is as follows: As the gather ascends and before it quite leaves the marverer the blow-out air is introduced by the release of the link 27ᵈ by the trigger 28ᵇ and such admission of blow-out air is completed about the time the gather on its descent passes the same point. The air is introduced in such quantity as will result in the formation of a central cavity of practically definite size in the interior of the gather when the air so introduced has finished its expansion. The air thus introduced in the gather is held there until its expansion is completed which occurs about when the blow-pipe is horizontal. In the continued descent of the gather to molding position one or more slight puffs of air are admitted to the gather from the main air supply, or it may be that a slight and continued flow of air into the gather from such supply is admitted, the object being to swell the gather. During the elongation there is also an admission of air to keep it plump and to aid in the even distribution during the drawing out. As the mold is closing the admission of air from a main air supply is made for the molding. The gather movement to present the gather to the mold also retracts the piston 26ᵃ against the tension of its spring 27ᶠ, where it will be caught by the trigger 28ᵇ, power being thus stored up to force the blow out air into the next gather.

I desire to call attention to the necessity, especially in the manufacture of light and delicate articles, such as bulbs for incandescent electric lamps, of introducing a limited and definite quantity of air into the preformed blank and positively holding in the gather for a short period the pressure so created. The amount of air introduced into the blow-pipe at this time is relatively small, and a small leakage has therefore the effect of greatly reducing the predetermined pressure in the blank, with a variation in the amount the blank is "blown out", which acts to destroy uniformity in the subsequent molding. Hence it is important that the sealing of the blow-pipe be as perfect as possible, and the ability to accomplish this is aided by placing the source from which the blow-out air is derived, and the valve by which it is controlled, both as close to the blow-pipe as possible, as the number of possibly leaky joints is thus reduced. It will be noted that in the construction shown in Figs. 4 to 7 the source and valve for the blow-out air are both on the blow-pipe frame and immediately adjacent to the end of the blow-pipe. Moreover since the valve for releasing the blow-out pressure is in the connection between the source of molding air and the blow-pipe, its use does not provide any additional point at which the molding air may escape, while the use of a piston pump, such as shown, for delivery directly to the blow-pipe on each stroke the exact quantity of air necessary for the blow-out, provides for the precise regulation of the air pressure for that purpose. It will be further noted that the blow-out air introduced into the blank is entirely separate and distinct from any air that may be subsequently introduced into the blank to give it the shape of the finished article.

Inasmuch as the claims of this application are restricted to air mechanisms, I do not by failure to make herein claims directed to other inventive features shown herein abandon the same. Claims covering certain of such other features are made in my other application, Serial Number 491,812, filed April 23, 1909, and in my applications, Serial Numbers 551,198 and 602,532 before referred to, as well as in my other application Serial Number 737,403, filed December 18, 1912, as a division of my said application 602,532.

Having thus described my invention what I claim is:

1. In a machine for the manufacture of blown glass articles, the combination with a glass carrier adapted to support an unconfined body of plastic glass, an intermittently actuated air compressor and connections therefrom for delivering air to the interior of the unconfined plastic glass, the compressor being constructed to deliver on each actuation the volume necessary to properly swell the glass and means for subsequently admitting air for molding, into the glass.

2. In a machine for the manufacture of blown glass articles, the combination with a glass carrier adapted to support an unconfined body of plastic glass, an intermittently actuated air compressor and connections therefrom for delivering air to the interior of the unconfined plastic glass, the compressor being constructed to deliver on each actuation the volume of air necessary to properly swell the glass, means for sealing in the glass the pressure so created, and means for subsequently admitting into the glass air for molding.

3. In a glass blowing machine, the combination with a supply of air under pressure, of a blow-pipe, a connection for introducing air for molding from the air supply into the blow-pipe, and a pump interposed in the air connection for introducing a limited amount of air into the pipe prior to the molding and for holding it therein by closing the said air connection and for opening the said connection prior to the molding.

4. In a glass blowing machine, the combination with a blow-pipe frame oscillating to present the gather on the blow-pipe therein for molding, of a pump cylinder on the said frame, a spring pressed piston in the said pump, a latch for holding the piston in its retracted position, and means successively actuated by the movement of the frame toward molding position to release the latch and to retract the piston.

5. In a glass blowing machine, the combination with a frame adapted to receive a blow-pipe, of a source of air under pressure for molding, a connection between the air source and the pipe, a pump cylinder on the blow-pipe frame in the said connection, a piston for the said pump and means actuated by the movement of the frame prior to reaching molding position to actuate the pump piston and compress a limited amount of air in the blow-pipe, and to hold it therein, and means actuated by a subsequent movement of the frame to retract the piston and release the pressure.

6. In a glass blowing machine, the combination with an oscillating frame adapted to receive a removable blow-pipe, and present it for molding, of a cylinder mounted in the frame and connected with the interior of the pipe, a source of molding air under pressure connected with the cylinder, a piston contained in the cylinder, a spring tending to make a compression stroke of the piston and to cause it to close the connection between the source of air and the pipe, a latch adapted to hold the piston against the pressure of the spring, means for releasing the latch on the movement of the frame toward molding position, an actuating link to retract the said piston and a cam track engaged by the said link on the further movement of the frame prior to the frame reaching molding position.

In testimony whereof I have signed my name in the presence of two witnesses.

BENJAMIN DAY CHAMBERLIN.

In presence of—
G. WILLIS DRAKE,
R. H. CURTIS.